(12) United States Patent
Aicher

(10) Patent No.: US 6,195,932 B1
(45) Date of Patent: Mar. 6, 2001

(54) MUSICAL ELECTRONIC INSECT KILLER

(75) Inventor: Steve A. Aicher, 5405 Pearlstone Dr., Antelope, CA (US) 95834

(73) Assignee: Steve A. Aicher, Antelope, CA (US)

( * ) Notice: Subject to any disclaimer, the term of this patent is extended or adjusted under 35 U.S.C. 154(b) by 0 days.

(21) Appl. No.: 09/376,707

(22) Filed: Aug. 17, 1999

(51) Int. Cl.[7] .................................................. A01M 1/22
(52) U.S. Cl. .................................................. 43/112; 43/137
(58) Field of Search ....................................... 43/112, 137

(56) References Cited

U.S. PATENT DOCUMENTS

| | | | |
|---|---|---|---|
| 5,269,091 | * | 12/1993 | Johnson et al. .......................... 43/98 |
| 5,269,092 | * | 12/1993 | Cobble ................................... 43/137 |
| 5,272,831 | * | 12/1993 | Willis .................................... 43/112 |
| 5,325,624 | * | 7/1994 | Richardson et al. .................... 43/112 |
| 5,351,436 | * | 10/1994 | Spalding et al. ........................ 43/137 |
| 5,519,963 | * | 5/1996 | Shih ....................................... 43/137 |
| 5,533,298 | * | 7/1996 | Teng ...................................... 43/112 |

FOREIGN PATENT DOCUMENTS

8700727 * 2/1987 (WO) .................................... 43/112

* cited by examiner

*Primary Examiner*—Kurt Rowan
(74) *Attorney, Agent, or Firm*—Sierra Patent Group, Ltd.

(57) ABSTRACT

An electronic insect killer apparatus which generates a musical song, noise or display in response to detecting the electrocution of an insect. The apparatus provides a light source for attracting insects to a pair of electrodes which electrocute insects which come in close proximity thereto. The apparatus monitors the load current delivered to the apparatus and activates a music player when the detected load current exceeds a predefined threshold associated with electrocution of an insect.

10 Claims, 2 Drawing Sheets

MUSICAL ELECTRONIC INSECT KILLER

BACKGROUND OF THE INVENTION

1. Field of the Invention

This invention pertains generally to insect killing devices, and more particularly to a musical electronic insect killing device which plays a song or musical melody when an insect is electrocuted by the device. The insect killing device monitors and senses the current load delivered to the device to ascertain frequency responses in the current load signal associated with electrostatic discharges used to electrocute insects. When the device determines an insect has been electrocuted from the current load signal, the device plays a song or musical melody.

2. Description of the Background Art

Electrical insect killers have been in use for many years for killing insects within an area or proximity. The modem day electronic insect killer typically includes a set of electrodes for electrocuting insects and one or more fluorescent lamps for attracting the insects to the electrodes. Normally, a transformer or electronic circuit converts conventional line voltage to a higher voltage which is provided across the electrodes for electrocuting the insects. The fluorescent lamps, electrodes and transformer are normally housed within a protective screen to protects users from potential electrical shock from the electrodes. As an insect flies toward the fluorescent lamps and comes into contact or into close proximity with the electrodes, an electrostatic discharge is provided across the electrodes through the insect, and the insect is killed thereby. These insect killers continue to kill additional insects which come into contact or into close proximity to the electrodes, but otherwise do not perform additional functions.

Accordingly, there is a need for an electronic insect killing apparatus which provides for means for monitoring and sensing when an insect is killed by the apparatus and means for activating a music player when an insect is determined to be killed by the apparatus. The present invention satisfies these needs, as well as others, and generally overcomes the deficiencies found in the background art.

SUMMARY OF THE INVENTION

The present invention is a musical electronic insect killer apparatus and method which plays a musical melody or song when an insect is killed by the apparatus. The apparatus provides a light source for attracting insects towards a set of electrodes enclosed within a protective screen. The apparatus provides a high voltage source across the electrodes so that when an insect comes in contact or in close proximity to the electrodes, the insect is electrocuted and thereby killed. The apparatus monitors and detects the load current delivered to the apparatus and activates a music player when the detected load current exceeds a predefined threshold associated with the electrocution of the insect by the apparatus. The present invention can be used with conventional electronic insect killer devices which are presently available.

In general terms, the invention comprises a hood, a base, a protective screen extending from the base to the hood, means for electrocuting an insect when the insect comes in contact or in close proximity to the electrocuting means, means for attracting insects to the electrocuting means, means for sensing the electrocution of the insect, and means for activating a music player when electrocution of the insect is sensed.

By way of example, and not of limitation, the attracting means comprises one or more fluorescent lamps producing UV (ultraviolet) light attached to a power supply. Preferably, each lamp is located within the protective screen and the length of each lamp extends from the hood to the base. The power supply is provided within the hood to illuminate each lamp for attracting insects.

The electrocuting means is generally provided by a set of electrodes connected to a high voltage means. Various configurations and arrangements for the set of electrodes may be used with the invention. For example, the electrodes may comprise a first and second wire mesh grid, with each grid structured and configured in a cylindrical shape, and with each grid depending downwardly from the hood to the base. The first grid generally has a larger circumference than the second grid and is enclosed within the protective screen. The fluorescent lamps are generally enclosed within circumference of the electrode grids and the protective screen. The high voltage means normally comprises an electronic circuit which converts conventional line voltage to a voltage level capable of electrocuting an insect when the insect comes in contact or close proximity to the electrode grids. The voltage generated by the electronic circuit is coupled to the first and second electrode grids providing a high frequency electrostatic field therebetween. Other high voltage means can also be utilized including a transformer. The high voltage means is housed within the hood and is activated when power is supplied to the apparatus.

Generally, when the apparatus is activated, power is delivered to the fluorescent lamp at a frequency which is predominantly sixty (60) hertz (Hz) with some power delivered at higher harmonics. The current drawn from delivering power to the fluorescent lamp continues while the apparatus remains activated and can thus be described as a "long term" average power consumed by the apparatus. When an insect comes in contact or in close proximity to the electrode grids, a short high frequency electro-static discharge is delivered across the electrode grids to electrocute and kill the insect. The discharge generally appears within the frequency ranges from approximately six (6) to sixty (60) Hz. This discharge generally occurs only when insects or other objects come is contact or close proximity to the electrode grids, and can thus be described as a "short term" event or power draw by the apparatus.

The means for sensing the electrocution of the insect comprises means for sensing "long term" average power consumption associated with providing power to the fluorescent lamp, means for sensing "short term" power consumption events associated with electric discharge between the electrode grids, means for comparing the "long term" average power consumption with the "short term" power consumption events to ascertain which predominates or is "emphasized", and means for a communicating a song activation signal when the "short term" power consumption events are emphasized or predominate over the "long term" average power consumption. The means for sensing the electrocution is preferably embodied in an electronic circuit mounted on a circuit board and is housed within the hood of the apparatus. The means for sensing long term average power consumption is preferably provided by a low pass filter circuit which emphasizes low frequencies associated with providing power to the fluorescent lamp. The means for sensing short term power consumption events is provided by a filter circuit emphasizing frequencies in range produced when a discharge occurs between the electrode grids. The comparison means is provided by a comparison circuit which accepts input from the low pass filter and the short term event filter and produces a song activation output signal where the short term event filter produces a higher output than the low pass filter by a predetermined amount.

The means for activating a music player when electrocution of the insect is sensed is provided by an electronic circuit or relay housed within the hood of the apparatus. The music player activation means is operatively coupled to the means for sensing the electrocution and the music player and carries out the operation of activating a music player when the means for sensing the electrocution produces a song activation output signal.

An object of the invention is to provide a musical electronic insect killer which generates a musical output responsive to the killing of an insect.

Another object of the invention is to provide a musical electronic insect killer which can quickly, easily and inexpensively be manufactured or retrofitted into existing electronic insect killing devices.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 1:
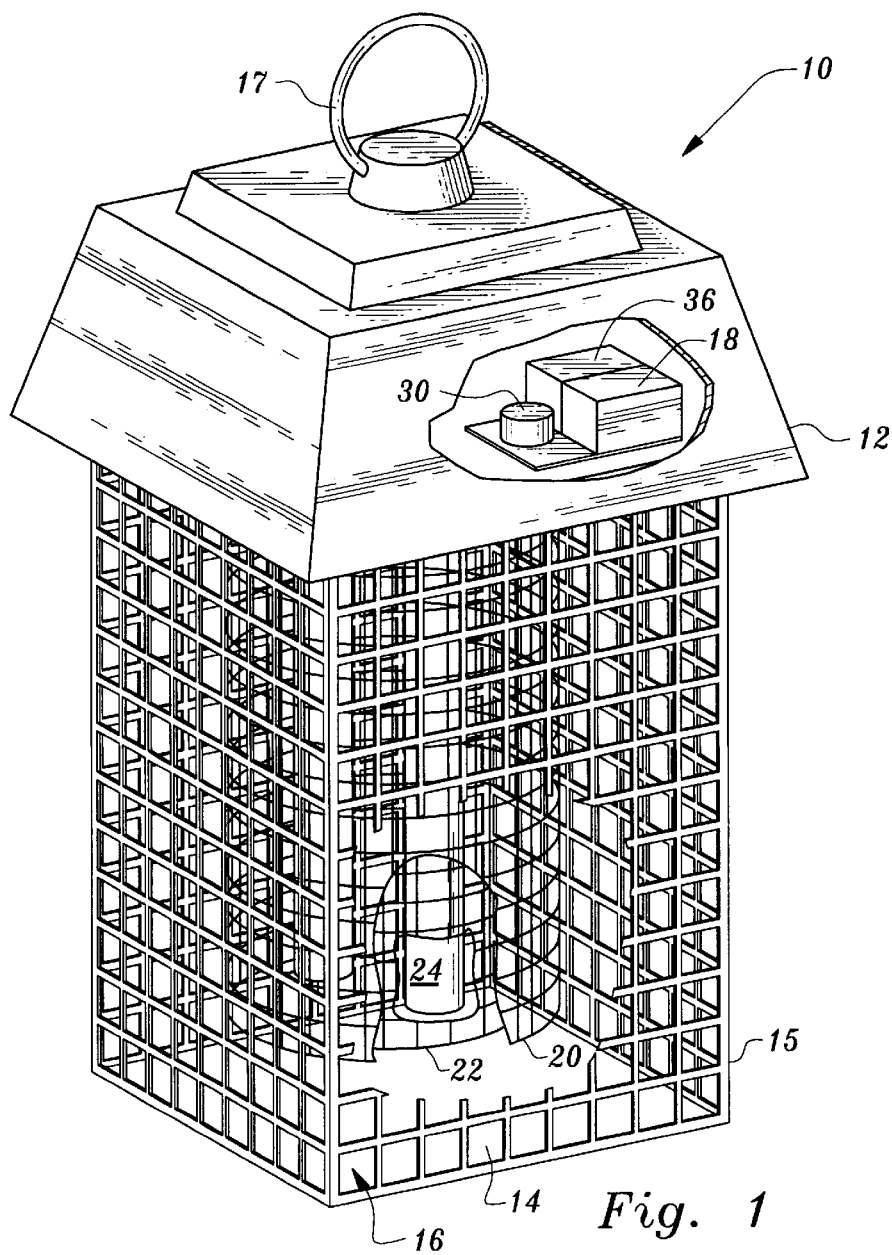
FIG. 1 is a perspective view of a musical electronic insect killer in accordance with the present invention.
Figure 2:
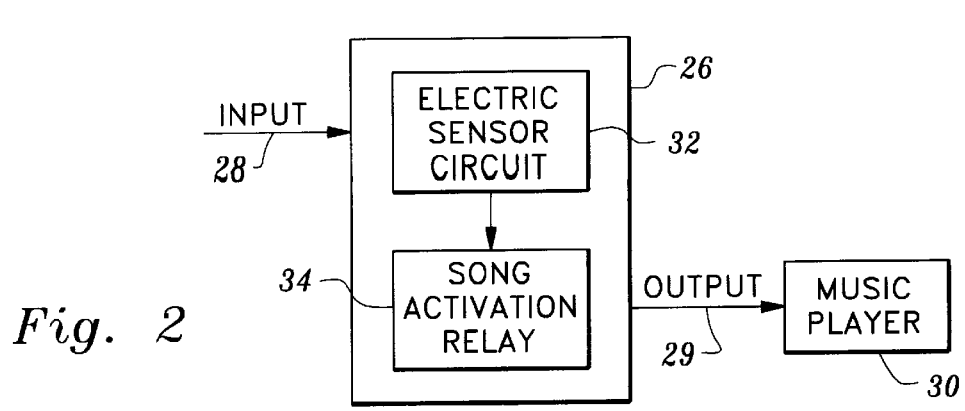
FIG. 2 is a is a functional block diagram of an electronic sensor circuit and song activation relay circuit in accordance with the present invention.
Figure 3:
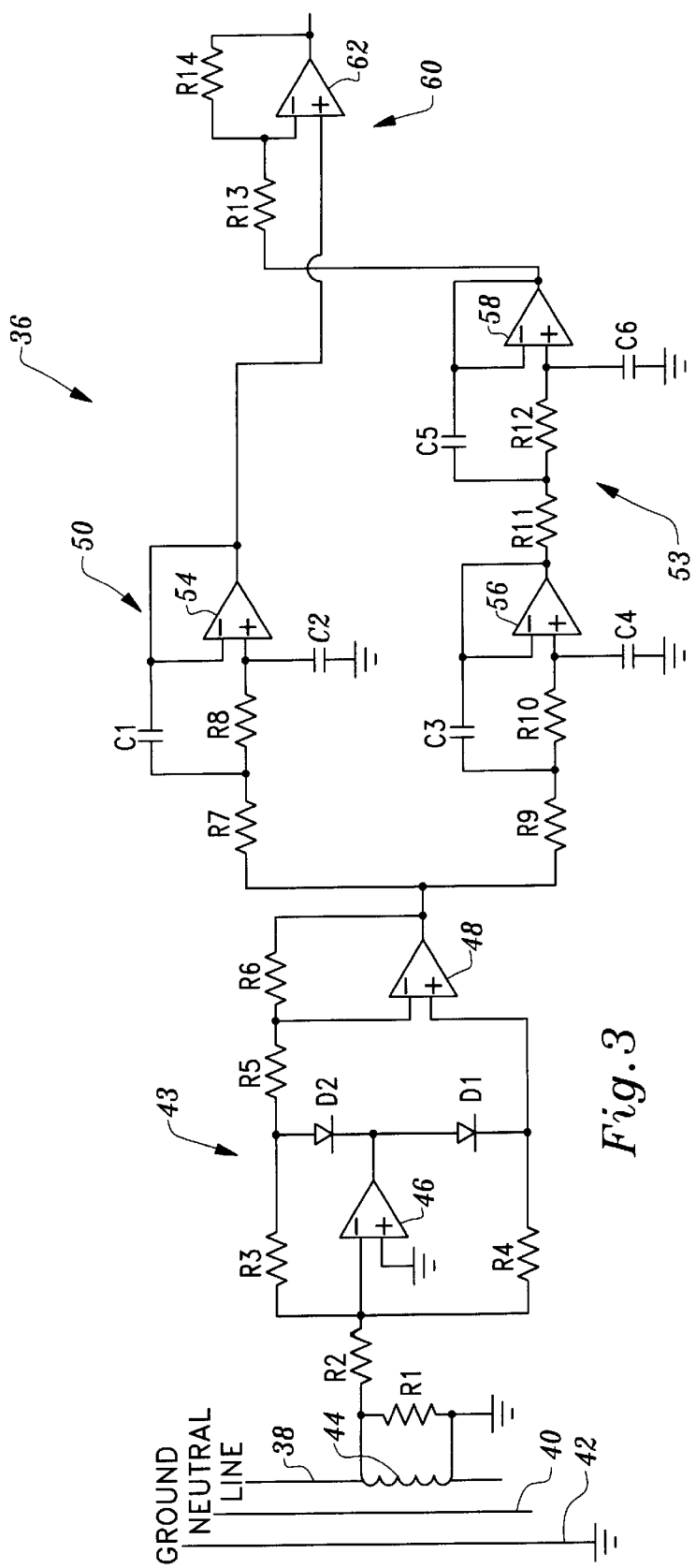
FIG. 3 is a schematic circuit diagram of the electronic sensor circuit of the musical electronic insect killer.

Referring more specifically to the drawings, for illustrative purposes the present invention is embodied in the apparatus shown in FIG. 1 through FIG. 3. It will be appreciated that the apparatus may vary as to configuration and as to details of the parts, and that the method may vary as to details and the order of the steps, without departing from the basic concepts as disclosed herein. The invention is disclosed generally in terms of a musical electronic insect killer apparatus, although numerous other uses for the invention will suggest themselves to persons of ordinary skill in the art.

Referring first to FIG. 1, there is generally shown a musical electronic insect killer apparatus 10 in accordance with the invention. The insect killer 10 includes a hood 12 and a base 14. A protective grid 15 extends from the peripheral edges of the base 14 to the lower peripheral edges of the hood 12 forming four walls which define the interior 16 of the insect killer. The protective grid 15 define openings thereon which are normally large enough to permit insects to enter the interior 16 of the insect killer 10, but which are small enough to prevent users or others from placing their fingers or other foreign object into the interior 16 of the apparatus 10 to prevent or avoid electric shock to the user of the invention.

Means for mounting or supporting electronic insect killer apparatus are also included in the invention. Generally the insect killer is mounted on a hook (not shown) or other mounting clip. Preferably, the means for mounting the insect killer 10 comprises a ring 17 attached to the top of the hood 12 for receiving the hook or other mounting clip.

The musical electronic insect killer 10 further includes means for electrocuting an insect when the insect comes in contact or in close proximity to the electrocuting means, as well as means for attracting insects to the electrocuting means. In the preferred embodiment, the means for electrocuting an insect is provided by a high voltage means coupled to a set of electrodes. The high voltage means preferably comprises an electronic circuit 18 which is normally housed within the hood 12 of the insect killer 10 to protect circuit 18 for moisture damage. Electronic circuit 18 carries out the operation of converting conventional line voltage (power source) to a voltage level capable of electrocuting an insect when the insect comes in contact or in close proximity to the electrodes. In an alternative embodiment, a battery source (not shown) may be used as the power source, in which case, the electronic circuit 18 also carries out the operation of converting voltage from the battery source (not shown) to a voltage level capable of electrocuting an insect when the insect comes in contact or in close proximity to the electrodes. The electronic circuit 18 preferably provides output voltage ranging from approximately 3000 to 5000 volts at a 60 Hz rate. This output voltage is communicated to a set of electrodes 20, 22 to electrocute and kill insects entering the interior 16 of insect killer 10 and which comes in contact or close proximity to the electrodes.

Preferably, electrodes comprise a first and second wire mesh grid 20, 22. Each electrode grid 20,22 is structured and configured in a cylindrical shape and depend downwardly from the hood 12. Electrode grid 20 has a cylindrical diameter larger than electrode grid 22 so then when electrode grids 20, 22 are positioned within the interior 16 of the insect killer 10, a generally constant gap is defined between electrode grid 20 and 22. Each electrode grid 20, 22 define openings thereon to permit insects to fly through openings. The output voltage generated by electronic circuit 18 is communicated to and applied across electrode grids 20,22 to create an electrostatic field therebetween. When an insect enter the interior 16 of insect killer 10 and touches grid 20 or grid 22 or enters the gap between grids 20, 22, an electrostatic discharge is delivered from grid 20 to grid 22 via the insect, thereby electrocuting and killing the insect. After the insect in killed, the insect will generally fall downward and the electrostatic discharge is terminated.

The means for attracting insects to the electrocuting means is provided by one or more fluorescent lamps 24 producing UV (ultraviolet) light. As shown three tubular fluorescent lamps 24 are positioned within the interior 16 of the insect kilter 10. Preferably, the fluorescent lamps 24 depend downwardly from the hood 12 and are centrally positioned along the longitudinal axis defined by cylindrically shaped electrode grids 20, 22. By centrally locating the fluorescent lamps 24, insects are encouraged to come into contact or into close proximity with electrode grids 20, 22, thereby increasing the likelihood of killing the insect. The fluorescent lamps 24 are powered by convention means typically with an electronic ballast circuitry and a power source (not shown).

Referring now to FIG. 2, as well as FIG. 1, the invention includes means for sensing the electrocution of the insect when an electrostatic discharged is delivered across grids 20, 22, as well as means for activating a music player when electrocution of the insect is sensed. The term "electrocution" as used herein refers generally to the oxidation, vaporization, burning, dehydration or other means of killing an insect in association with electrodes of various sizes, shapes and types. The electrocution sensing means preferably comprises a circuit board or like hardware device 26.

Circuit board 26 includes current load input contacts 28 which are operatively coupled to line conductor 38 (FIG. 3) associated with the power supply for the insect killer 10. Circuit board 26 further includes music player output contacts 29 which are operative coupled to input contacts associated with a music player 30.

Circuit board 26 includes hardware or circuitry which provides means for sensing the electrocution of the insect, shown generally as electric sensor circuit 32. Electric sensor circuit 32 carries out the operation of periodically monitoring and sensing the load current delivered to the insect killer 10, and ascertaining short term power consumption events associated with the electrocution of an insect and long term average power consumption associated with providing power for the fluorescent lamps 24. Electric sensor circuit 32 also carries out the operation of comparing short term power consumption events with long terms average power consumption and generating a song activation signal when the short term power consumption events exceed the long average power consumption by a predetermined amount.

Electric sensor circuit 32 continuously monitors and senses the load current delivered to the insect killer 10 by monitoring the power source provided to the fluorescent lamps 24 and the electrode grids 20, 22. Power is delivered to insect killer 10 normally via standard 110 AC line voltage, although a battery source may also be used. The current drawn by the fluorescent lamps 24 normally appears in the frequency range below approximately six (6) Hz. The current drawn by an electrostatic discharge between grids 20, 22 normally appears in the frequency range between approximately six (6) to sixty (60) Hz.

Referring also to FIG. 3, electric sensor circuit 32 includes an active full-wave bridge rectifier circuit 36 to convert the AC line voltage provided to insect killer 10 into a rectified voltage signal. Electric sensor circuit 32 further provides a first and second filter circuit 50, 52, with each of the filter circuits 50, 52 having input contacts operatively coupled to the rectified voltage output signal produced by the full-wave bridge rectifier circuit. The first filter circuit 50 comprises a two-pole low pass filter circuit with its "corner" frequency in at about 3.8 Hz with a damping factor about approximately 0.707 thereby producing an output signal emphasizing the frequency range below approximately six (6) Hz of the power consumed by insect killer 10. The first filter circuit 50 thusly emphasizes the long term average output signal corresponds to the continuous current draw by the fluorescent lamps 24. The second filter circuit 52 comprises a butterworth four-pole filter circuit with its corner frequency at about nineteen (19) Hz with a damping factor of the first stage at approximately 0.540 and the damping factor of the second stage at approximately 1.308 thereby producing an output signal emphasizing the frequency range approximately between six (6) to sixty (60) Hz of the power consumed by the insect killer 10. The second filter circuit 52 thusly emphasizes short term average output signal corresponds to the short high frequency electrostatic discharge occurring between electrode grids 20, 22 when an insect is electrocuted therebetween. Electric sensor circuit 32 also includes a comparison circuit 60 for comparing the signal output from the low pass filter with the signal output from the four-pole circuit to ascertain when an insect killer 10 has electrocuted an insect via electrode grids 20, 22. The comparison circuit 60 produces a negative output signal or "song activation" signal when the short term average output signal is greater than the long term average output signal by a predetermined amount. When the short term average output signal is not greater than the long term average output signal by the predetermined amount, comparison circuit 60 produces a positive or "normal" output signal. Circuitry for electric sensor circuit 32 is described in more detail below. The use of a transformer to produce an electric signal proportional to load current is only one possible current detecting means. Load current through conductors 38, 40 could alternatively be sensed or detected by heat, magnetic field or other effect associated with the passage of current through a conductor, with corresponding responsive signal outputs generated.

Circuit board 26 flier includes hardware or circuitry which provides means for activating a music player when electrocution of the insect is sensed by electric sensor circuit 32, shown generally as song activation relay 34. Song activation relay 34 carries out the operation of continuously monitoring output signal from electric sensor circuit 32 and activating the music player when a song activation signal is produces by electric sensor circuit 32.

The circuitry of the electric sensor circuit 32 is generally shown and designated as 36, as noted above. Circuitry 36 is preferably mounted on a circuit board 26 and is housed and mounted within the hood 12 of the insect killer 10. The power source is provided to the insect killer 10 by standard 110 AC line voltage via a line conductor 38, a neutral conductor 40, and a ground conductor 42. The present invention may be adapted to sense the current through line conductor 38 externally using a an adapter plug (not shown) or internally within the hood 12 of the insect killer 10. The current load delivered to the insect killer 10 is converted into a rectified voltage signal proportional to the current drawn by the insect killer 10 by a current transformer and active full-wave bridge rectifier circuit and is designated 43. Current transformer and active full-wave bridge rectifier circuit 43 comprises secondary windings 44, resistors R1–R6, operation amplifiers (op-amp) 46, 48, and diodes D1,D2. Line conductor 38 passes through secondary windings 44 of current transformer circuit 43. The first end of secondary winding 34 and the first end of resistor R1 is connected to the first end of resistor R2. The second end of secondary winding 34 and the second end of resistor R1 is connected to the ground. A voltage signal is generated in the secondary winding 34 of the current transformer circuit 43 by the load current passing through conductor 38. The values of resistor R1 and secondary winding 34 is selected to produce a voltage of about 50 mV across resistor R1. The second end of resistor R2 is connected to the first end of resistor R3, to the first end of resistor R4 and to the negative terminal of inverting op-amp 46. The positive terminal of inverting op-amp 46 is connected to the ground. Diode D1 provides negative feed back for op-amp 46 is connected to the second end of resistor R4. Diode D2 is provided at the second end of resistor R3 to clamp the op-amp 46 output. The positive terminal of op-amp 48 is connected to and follows diode D1. The first end of R5 is connected to the second end of R3. The second end of resistor R5 is connected to the positive terminal of op amp 48. Resistor R6 is provided across the feedback loop of op-amp 48. The values of R2–R6 are selected to produce a gain of about ten and an output voltage of about five hundred mV rectified AC at the output terminal of op-amp 48.

The output signal of rectifier 43 is connected to a two-pole low-pass filter circuit designated as 50 and to a four-pole short-term average filter circuit 52. As described above low-pass filter circuit 50 is designed to emphasize the long term average current draw or consumption of insect killer 10 associated with fluorescent lamps 24. Short-term average filter circuit 52 is designed to emphasize the short term average current draw or consumption of insect killer 10 associated with electrostatic discharge between electrode grids 20, 22 when an insect is electrocuted.

Low-pass filter circuit 50 is preferably a Sallen-Key low-pass filter with its comer frequency at about 3.8 Hz. Low-pass filter circuit 50 comprises resistors R7, R8, capacitors C1, C2 and op-amp 54. The input signal from op-amp 48 is connected to first the end of resistor R7. The second end of resistor R7 is connected to the first end of capacitor C1 and to the first end of resistor R8. The second end of capacitor C1 is connected to the negative terminal of op amp 54. The second end of resistor R8 and the positive terminal of op amp 54 are connected to the first end of capacitor C2. The second end of capacitor C2 is connected to the ground. The output of op-amp 54 is connected to the negative terminal of op-amp 54 to provide feedback. The values of resistors R7, R8 and capacitors C1, C2 are selected so that the output response signal from op-amp 54 emphasizes filters frequency responses less than approximately 6 Hz.

Short-term average filter circuit 52 is preferable a first two-pole Sallen-Key lowpass filter cascaded with a second two-pole Sallen-Key low-pass filter to generate a higher-order filter with its comer frequency at about nineteen (19) Hz. Short-term average filter circuit 52 comprises resistors R9, R10, capacitors C3, C4, and op-amp 56 corresponding to the first two-pole low-pass filter and resistors R11, R12, capacitors C5, C6, and op-amp 58 corresponding to the second two-pole low-pass filter. The input signal from op-amp 48 is connected to the first end of resistor R9. The second end of resistor R9 is connected to the first end of capacitor C3 and to the first end of resistor R10. The second end of capacitor C3 is connected to the negative terminal of op amp 56. The second end of resistor R8 and the positive terminal of op amp 56 are connected to the first end of capacitor C4. The second end of capacitor C4 is connected to the ground. The output of op-amp 56 is connected to the negative terminal of op-amp 56 to provide feedback. The input signal from op-amp 58 is connected to first the end of resistor R11. The second end of resistor R11 is connected to the first end of capacitor C5 and to the first end of resistor R12. The second end of capacitor C5 is connected to the negative terminal of op amp 58. The second end of resistor R8 and the positive terminal of op amp 58 are connected to the first end of capacitor C6. The second end of capacitor C6 is connected to the ground. The output of op-amp 58 is connected to the negative terminal of op-amp 58 to provide feedback. The values of resistors R9–R12, capacitors, C3–C6 are selected so that the output signal from op-amp 58 emphasizes filter frequency responses between approximately six(6) to sixty (60)Hz.

The output signal generated by low-pass filter circuit 50 and the output signal generated by short-term average filter circuit 52 is connected to comparison circuit 60 to determine whether the short term average events are "emphasized" over the long term events. As noted above, comparison circuit 60 will produce a negative output (song activation) signal when the short term average events are emphasized over the long term average events. Comparison circuit 60 will produce a positive output signal when the short term average events are not emphasized over the long term average events. Comparison circuit 60 is preferably a differential circuit and comprises resistors R13, R14 and op-amp 62. The output signal from op-amp 54 is connected to positive terminal of op-amp 62. The output signal from op-amp 58 is connected to the first end of resistor R13. The second end of resistor R13 is connected to the negative terminal of the op-amp 62. The resistor R14 is provided across the feedback loop of op-amp 62. The values of resistors R13, R14 are selected so that op-amp 62 produces negative output signal when the output signal from op-amp 58 is emphasized over the output signal from op-amp 54. Op-amp 62 produces a positive output signal when the output signal from op-amp 58 is not emphasized over the output signal from op-amp 54.

In operation, a user of the invention will provide power to the insect killer 10 by inserting the connector plug of the invention into a conventional electrical receptacle. Electrical current from the receptacle is provided to power the fluorescent lamps 24 to attract insects and to provide power to the electronic circuit 18. Electronic circuit 18 converts the line voltage from the electrical receptacle to approximately 3000 to 5000 volts across electrode grids 20, 22 creating an electrostatic field therebetween. When an insect enter the interior 16 of insect killer 10 and touches grid 20 or grid 22 or enters the gap between grids 20, 22, an electrostatic discharge is delivered from grid 20 to grid 22 via the insect, thereby electrocuting and killing the insect. After the insect in killed, the insect will generally fall downward and the electrostatic discharge is terminated.

Electric sensor circuit 32 caries out the operation of periodically monitoring and sensing the load current delivered to the insect killer 10, and ascertaining short term power consumption events associated with the electrocution of an insect and long term average power consumption associated with providing power for the fluorescent lamp 24 as described above. Electric sensor circuit 32 also carries out the operation of comparing short term power consumption events with long terms average power consumption and generating a song activation signal when the short term power consumption events exceed the long average power consumption by a predetermined amount. The song activation signal is communicated to song activation relay circuit 34 which activates music player 30 to play a song or musical melody.

The music player 30 may alternatively, or additionally, comprise a non-music noise generator, a light display (not shown), or other form of display responsive to the activation signal.

Accordingly, it will be seen that this invention provides an electronic insect killing apparatus which provides for means for monitoring and sensing when an insect is killed by the apparatus and means for activating a music player when an insect is determined to be killed by the apparatus. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An electronic insect killer comprising:
   (a) a music player;
   (b) means for electrocuting an insect:
   (c) means for monitoring and sensing a long term average power consumption of said insect killer;
   (d) means for monitoring and sensing a short term power consumption of said electrocution means;
   (e) means for comparing said long term average power consumption with said short term power consumption; and (f) means for communicating a song activation signal when said comparing means determines said short term power consumption exceeds said long term average power consumption.

2. An electronic insect killer as recited in claim 1, wherein said means for sensing the electrocution of the insect comprises means for sensing the load current delivered to said electrocution means.

3. An electronic insect killer as recited in claim 1, further comprising means for attracting insects to said electrocution means.

4. An electronic insect killer as recited in claim 3, wherein said means for attracting insects to said electrocution means comprises at least one fluorescent lamp.

5. An electronic insect killer as recited in claim 4, wherein:

(a) said means for monitoring and sensing a long term average power consumption of said insect killer comprises means for monitoring and sensing long term average power consumption of said fluorescent lamp; and (b) said means for monitoring and sensing a short term power consumption of said electrocution means comprises means for monitoring and sensing short term power consumption of said fluorescent lamp.

6. An electronic insect killer as recited in claim 1, wherein said means for electrocuting an insect comprises:

(a) a first and second electrode; and (b) high voltage means connected to said first and second electrodes.

7. A musical electronic insect killer as recited in claim 3, further comprising means for attracting insects to said first and second electrodes.

8. A method for killing insects, comprising the steps of:

(a) attracting an insect, with at least one fluorescent lamp, to a pair of electrodes;

(b) electrocuting an insect with said pair of electrodes;

(c) monitoring and sensing a long term average power consumption of said pair of electrodes and said fluorescent lamp;

(d) monitoring and sensing a short term power consumption of said pair of electrodes;

(e) comparing said long term average power consumption with said short term power consumption; and (f) activating a music player when said short term power consumption exceeds said long term average power consumption.

9. A method as recited in claim 1, further comprising the step of sensing a load current delivered to said pair of electrodes.

10. A method as recited in claim 1, wherein said activating step is carried out by communicating a song activation signal to a music player when said short term power consumption exceeds said long term average power consumption.

* * * * *